(12) United States Patent
Stebila et al.

(10) Patent No.: US 8,776,176 B2
(45) Date of Patent: Jul. 8, 2014

(54) MULTI-FACTOR PASSWORD-AUTHENTICATED KEY EXCHANGE

(75) Inventors: Douglas J. Stebila, Waterloo (CA); Poornaprajna V. Udupi, Sunnyvale, CA (US); Sheueling Chang Shantz, Cupertino, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1288 days.

(21) Appl. No.: 12/143,964

(22) Filed: Jun. 23, 2008

(65) Prior Publication Data

US 2009/0288143 A1     Nov. 19, 2009

Related U.S. Application Data

(60) Provisional application No. 61/053,957, filed on May 16, 2008.

(51) Int. Cl.
*G06F 21/00*     (2013.01)

(52) U.S. Cl.
USPC .......................................................... 726/3

(58) Field of Classification Search
USPC .......................................................... 726/3
See application file for complete search history.

(56) References Cited

U.S. PATENT DOCUMENTS

| | | | | |
|---|---|---|---|---|
| 2001/0029581 | A1* | 10/2001 | Knauft | 713/193 |
| 2002/0178366 | A1* | 11/2002 | Ofir | 713/182 |
| 2003/0093698 | A1* | 5/2003 | Challener et al. | 713/202 |
| 2006/0093138 | A1* | 5/2006 | Durand et al. | 380/44 |
| 2007/0067625 | A1* | 3/2007 | Jiang et al. | 713/168 |
| 2007/0067629 | A1* | 3/2007 | Mackenzie et al. | 713/168 |

OTHER PUBLICATIONS

Abdalla, Michel et al., "Strong Password-Based Authentication in TLS using the Three-Party Group Diffie-Hellman Protocol", International Journal of Security and Networks, http://www.inderscience.com/search/index.php?action=record&rec_id=13181&prevQuery=&ps=10&m=or, 2006, pp. 1-18.

Gennaro, Rosario et al., "A Framework for Password-Based Authenticated Key Exchange", http://cat.inist.fr/?aModele=afficheN&cpsidt=14934236, Jun. 24, 2004, pp. 1-44.

OCC Bulletin "Authentication in an Internet Banking Environment", http://www.ffiec.gov/pdf/authentication_guidance.pdf, pp. 2005, 1-16.

"FFIEC Releases Guidance on Authentication in Internet Banking Environment" http://www.ffiec.gov/press/pr101205.htm, Oct. 12, 2005.

\* cited by examiner

*Primary Examiner* — William Goodchild
(74) *Attorney, Agent, or Firm* — Park, Vaughan, Fleming & Dowler LLP

(57) ABSTRACT

Apparatus, methods, and computer program products are disclosed that enable a first computer and a second computer to mutually authenticate each other over a network. A first computer sends first authentication evidence to a second computer. The first authentication evidence is used to prove to the second computer that the first computer has access to a first plurality of authentication secrets without exposing the first plurality of authentication secrets. In addition, the second computer sends second authentication evidence to the first computer. The second authentication evidence is used to prove to the first computer that the second computer has access to a second plurality of authentication secrets without exposing the second plurality of authentication secrets. The first plurality of authentication secrets is related to the second plurality of authentication secrets. Thus, the first computer is authenticated to the second computer and the second computer is authenticated to the first computer.

19 Claims, 11 Drawing Sheets

MFPAK User Registration

| Client $C$ | Server $S$ |
|---|---|
| 1. $pw_{C,S} \in_R$ Passwords | |
| 2. $rec_{C,S} \in_R$ Responses | |
| 3. $(V, W) \leftarrow Gen(1^\kappa)$ | |
| 4. $\gamma' = (H_1(C, S, pw_{C,S}))^{-1}$ | |
| 5. $V' = H_2(C, S, pw_{C,S}) \oplus V$ | |
| 6. $V'' = H_3(V)$ | |
| 7. $\tau' = (H_4(C, S, rec_{C,S}))^{-1}$ | |
| 8. $\xrightarrow{\quad C, \gamma', W, V', V'', \tau' \quad}$ | |
| 9. | Store $pw_S[C] = \langle \gamma', W, V', V'' \rangle$ |
| 10. | Store $res_S[C] = \tau'$ |

FIG. 7

MFPAK Login

| Client $C$ | Server $S$ |
|---|---|
| | 7. Abort if $\neg\text{Acceptable}(m)$ |
| | 8. $y \in_R \mathbb{Z}_q$ |
| | 9. $Y = g^y$ |
| | 10. $\langle \gamma', W, V', V'' \rangle = \text{pw}_S[C]$ |
| | 11. $\tau' = \text{res}_S[C]$ |
| | 12. $X = m \cdot \gamma' \cdot \tau'$ |
| | 13. $\sigma = X^y$ |
| | 14. $\text{sid} = \langle C, S, m, Y \rangle$ |
| | 15. $k = H_5(\text{sid}, \sigma, \gamma', \tau')$ |
| | 16. $a' = H_6(\text{sid}, \sigma, \gamma', \tau')$ |
| | 17. $a = a' \oplus V'$ |
| 18. | $\xleftarrow{Y, k, a, V''}$ |

FIG. 9

MFPAK Login

| Client $C$ | | Server $S$ |
|---|---|---|
| 19. $\sigma = Y^x$ | | |
| 20. $\gamma' = \gamma^{-1}$ | | |
| 21. $\tau' = \tau^{-1}$ | | |
| 22. $\text{sid} = \langle C, S, m, Y \rangle$ | | |
| 23. Abort if $k \neq H_5(\text{sid}, \sigma, \gamma', \tau')$ | | |
| 24. $k' = H_7(\text{sid}, \sigma, \gamma', \tau')$ | | |
| 25. $a' = H_6(\text{sid}, \sigma, \gamma', \tau')$ | | |
| 26. $V' = a' \oplus a$ | | |
| 27. $V = H_2(C, S, \text{pw}_{C,S}) \oplus V'$ | | |
| 28. Abort if $V'' \neq H_3(V)$ | | |
| 29. $s = \text{Sign}_V(\text{sid})$ | $\xrightarrow{k', s}$ | |
| 30. | | |

FIG. 10

| MFPAK Login | |
|---|---|
| Client $C$ | Server $S$ |
| | 31. Abort if $k' \neq H_7(\text{sid}, \sigma, \gamma', \tau')$ |
| | 32. Abort if $\neg\text{Verify}_W(\text{sid}, s)$ |
| 33. $\text{sk} = H_8(\text{sid}, \sigma, \gamma', \tau')$ | $\text{sk} = H_8(\text{sid}, \sigma, \gamma', \tau')$ |

FIG. 11

MULTI-FACTOR PASSWORD-AUTHENTICATED KEY EXCHANGE

CROSS-REFERENCE TO RELATED APPLICATIONS

This application claims the benefit of U.S. Provisional Application No. 61/053,957, filed: 16 May 2008, entitled Multi-Factor Password-Authenticated Key Exchange, having inventors Stebila et al., which is hereby incorporated by reference in its entirety.

BACKGROUND

1. Technical Field

The disclosed technology relates to the field of computer authentication technology.

2. Related Art

Two major security problems on the Internet are phishing and spyware. Phishing, or server impersonation, occurs when a malicious server convinces a user to reveal sensitive personal information, such as a username and password or other secrets, to a malicious server instead of the server to which the user intended to connect; the malicious server can then use the user's secrets to impersonate the user to the intended server. Additionally, many users' computers are compromised with spyware, which can record users' keystrokes (and thus passwords or other secrets) and again provide this information to a malicious party.

While wide-spread use of certificates obtained through a public key infrastructure (PKI) would obviate these problems the public has not embraced PKI technology. Thus, it is difficult to create a secure channel between a user's client computer and a server system using PKI technology. Several techniques are currently used that are intended to address phishing attacks. For example, physical devices that generate one-time passwords can be used to secure corporate virtual private networks (VPNs) and online banking sessions; server-side multi-layer techniques using additional attributes, such as HTTP cookies, IP address, and browser user agent string, can also be used. These techniques can offer greater assurance as to the identity of the user but, even when deployed over today's web security protocol HTTPS/TLS, remain susceptible to sophisticated impersonation attacks, because the protocols underlying these techniques do not protect authentication secrets or provide strong protocols for client-to-server and server-to-client authentication. In addition, many server systems require a login ID that is difficult to guess, such as a fixed-length string of digits or a combination of alphanumeric characters. But, these login IDs are not easily human-memorable and are difficult to use.

Password-authenticated key exchange is a strong technique to defend against impersonation (phishing) attacks and provide server-to-client authentication, but current protocols depend solely on a long-term password, which can be risky when used on a spyware-infested computer, as the long-term password can be captured and misused by others.

Authentication secrets can be classified as being within an authentication factor. Commonly used authentication factors include: something that a user has, something that a user knows, and something that a user is or does. Multi-factor authentication requires that information from two or more of these authentication factors be used to authenticate the user and server system (that is, the use of multiple information that is classified under the same authentication factor is not multi-factor authentication). Multi-factor authentication adds a further degree of assurance to the authentication procedure. Long-term passwords are easily memorized, infrequently changed, and are used repeatedly. One-time responses are used once, change frequently and, though not easily memorized, can be provided by a small electronic token or a sheet of paper. These factors offer different but complementary resistance to different types of compromise. Together, they offer more assurance in authentication because stealing the long-term password alone (for example, by installing spyware) or losing the one-time password card alone is insufficient to compromise the authentication procedure.

FIG. 1 illustrates an existing security vulnerability 100 when current computer authentication technology is used. Here, a user of a client computer system 101 desires to make a connection to an intended host system 103. However, an adversary system 105 exists that can intercept and forward communication between the client computer system 101 and the intended host system 103 using a man-in-the-middle (MITM) attack. Thus, instead of the client computer system 101 and the intended host system 103 establishing an intended network connection 107, they have established a first adversary network connection 109 between the client computer system 101 and the adversary system 105, and a second adversary network connection 111 between the adversary system 105 and the intended host system 103. Once the adversary system 105 is in the communication path between the user's client computer system 101 and the intended host system 103, the adversary system 105 can capture and misuse the user's secrets.

This vulnerability results from the adversary system 105 being able to fool the user into thinking that the adversary system 105 is the intended host system 103 so that the user establishes the first adversary network connection 109 and makes it secure (thus mimicking the intended host system 103). Once the user has established the first adversary network connection 109 (thinking that he/she has established the intended network connection 107), the adversary system 105 then captures authentication secrets from the user and uses the captured authentication secrets to establish the second adversary network connection 111 and impersonate the user to the intended host system 103. Information sent by the user is captured by the adversary system 105 and forwarded to the intended host system 103, and responses from the intended host system 103 are likewise captured by the adversary system 105 and forwarded to the user. Thus, the user's authentication secrets and other private information are exposed to the adversary system 105. In addition, the adversary system 105 has gathered significant authentication data (account, long-term password, challenge/response information, etc.). Other vulnerabilities exist if the intended host system 103 maintains a readable, guessable, or otherwise cryptographically easy password database.

Password-authenticated key exchange was first introduced by in 1992 (Steven M. Bellovin and Michael Merritt. *Encrypted key exchange: Password-based protocols secure against dictionary attacks*, In Proceedings of the 1992 IEEE Computer Society Conference on Research in Security and Privacy, May 1992) in the form of encrypted key exchange (EKE), a protocol in which the client computer and server system shared the plaintext password and exchanged encrypted information to allow them to derive a shared session key.

Bellovin and Merritt introduced an *Augmented encrypted key exchange: a password-based protocol secure against dictionary attacks and password file compromise*, Technical report, AT&T Bell Laboratories, c. 1994. The augmented EKE removed the requirement that the server have the plaintext password, instead having a one-way function of the password. The former is called a symmetric password-based protocol, because both the client computer and the server system share the same plaintext password, whereas the latter is called asymmetric.

The lack of an easy-to-use secure authentication mechanism has been a long-standing problem, because users like to use passwords that they can remember and because current single-factor password authentication technology offers little protection when weak and easily-guessed passwords are used (such passwords are considered to be low-entropy passwords). For example, such passwords can be discovered when messages captured during a protocol run are used in a "dictionary attack."

The following United States patents represent password-authenticated key exchange technology: U.S. Pat. No. 5,241,599; U.S. Pat. No. 5,440,635; U.S. Pat. No. 6,226,383; U.S. Pat. No. 6,539,479; and U.S. Pat. App. No. 20050157874. None of these teach or suggest the use of multiple authentication factors in a password-authenticated key exchange protocol where the authentication secrets are not exposed to either party or to the network. They do teach aspects of the technology assumed to be known to one skilled in the art and so U.S. Pat. No. 5,241,599, is hereby incorporated by reference; U.S. Pat. No. 5,440,635 is hereby incorporated by reference; U.S. Pat. No. 6,226,383 is hereby incorporated by reference; U.S. Pat. No. 6,539,479 is hereby incorporated by reference; and U.S. Pat. App. No. 20050157874 is hereby incorporated by reference.

There exist two-factor authentication schemes that do not provide cryptographic protection for the two factors. In a multi-channel system, the short-term password (an authentication factor that the user now has) can be delivered over a separate second channel (for example, via an SMS text message on a mobile phone). Once received, the user can then input the short-term password into their web browser along with their long-term password (an authentication factor that the user knows). In a multi-layer system, the server system evaluates additional attributes such as an HTTP cookie, IP address, and browser user agent string to heuristically analyze whether the user is likely to be authentic.

Some multi-layer systems try to offer additional reassurance to the user of the server's identity by presenting the user with a customized image or string. While these multi-channel and multi-layer approaches can offer some increased assurance, they can be defeated by non-cryptographic means such as sophisticated MITM attacks and spyware, and have been shown to be easily ignored by users.

It would be advantageous to design a multi-factor protocol that can leverage multiple authentication secrets, and that can enable each system to verify that the other system has access to authentication secrets securely in a multi-factor key exchange cryptographic protocol, without exposing the authentication secrets to the network or to the other system.

BRIEF DESCRIPTION OF THE FIGURES

FIG. 7 presents the MFPAK registration protocol;
FIG. 9 presents the MFPAK login protocol server phase 1;
FIG. 10 presents the MFPAK login protocol client phase 2;
and
FIG. 11 presents the MFPAK login protocol server phase 2 and shared key establishment.

DETAILED DESCRIPTION

Figure 1:
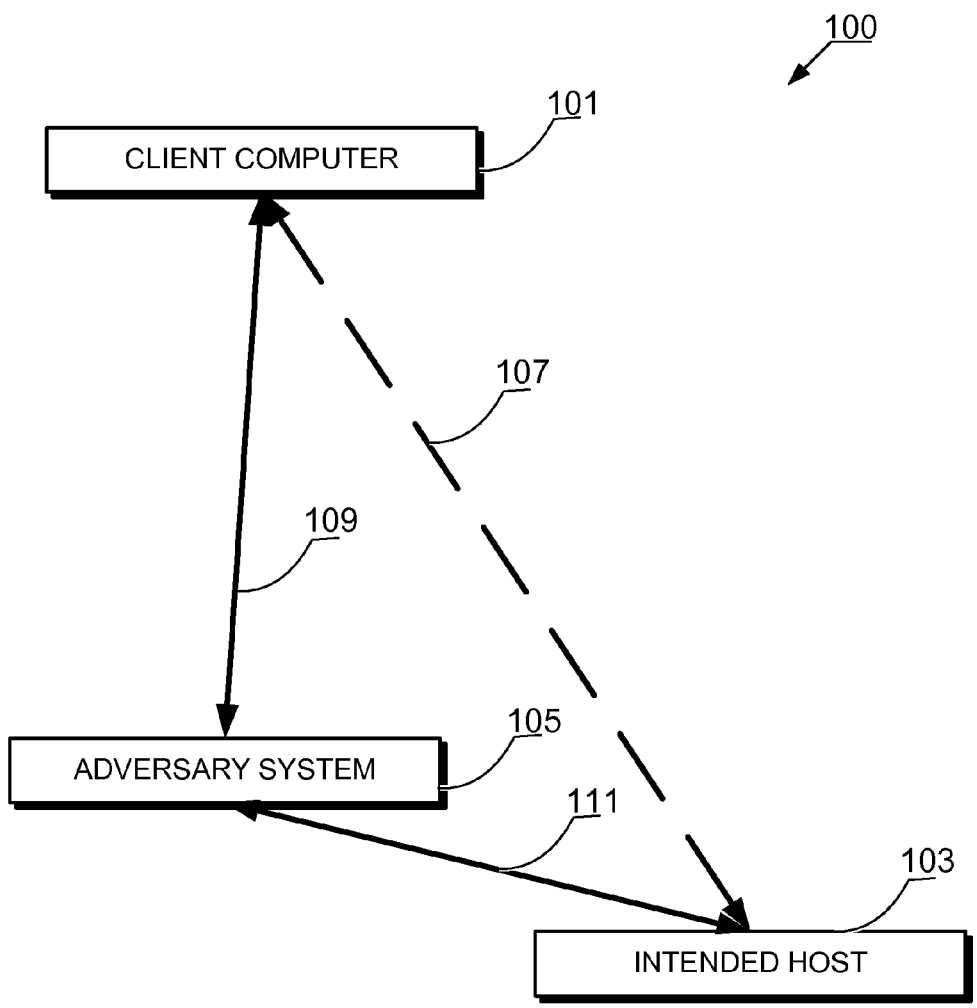
FIG. 1 illustrates an existing security vulnerability.

The technology disclosed herein teaches methods, apparatus, and program products that enable a first computer and a second computer to mutually authenticate each other over a network. A first computer sends first authentication evidence to a second computer. The first authentication evidence is used to prove to the second computer that the first computer has access to a first plurality of authentication secrets without exposing the first plurality of authentication secrets. In addition, the second computer sends second authentication evidence to the first computer. The second authentication evidence is used to prove to the first computer that the second computer has access to a second plurality of authentication secrets without exposing the second plurality of authentication secrets. The first plurality of authentication secrets is related to the second plurality of authentication secrets. Thus, the first computer is authenticated to the second computer and the second computer is authenticated to the first computer. Apparatus that perform the method, and program products that contain computer instructions that, when executed by the computer, cause the computer to perform the method, are also disclosed.

Furthermore, disclosed technology teaches methods, apparatus, and program products that enable a first computer to send first authentication evidence over a network where the first authentication evidence is capable of enabling a second computer to verify that the first computer has access to a first plurality of authentication secrets without exposing the first plurality of authentication secrets. In addition, the first computer receives second authentication evidence over the network. The second authentication evidence enables the first computer to verify that the second computer has access to a second plurality of authentication secrets without exposing the second plurality of authentication secrets. The first plurality of authentication secrets is related to the second plurality of authentication secrets. Thus, the second computer is authenticated by the first computer and the first computer can be authenticated by the second computer.

One skilled in the art will understand that the user is generally the entity that knows the first authentication secret and that has a means to obtain the second authentication secret. The user enters these authentication secrets into the computer (the client computer) being used to access the server system. In addition, business-to-business systems, web service applications, etc. can have access to the authentication secrets and provide them to the server system without direct user intervention. One skilled in the art will be able to distinguish between user and client computer from the context. Such a one will also understand that no distinction is made between italic symbols in the formulas herein as opposed to italic or non-italic symbols in the tables and text. Evidence can be sent from one computer to prove that that computer has a characteristic. The receiving computer attempts to verify the received evidence sent as proof. If the characteristic is related to secrets that are used to authenticate the sending computer the evidence is verified and the receiving computer has authenticated the sending computer.

A proper multi-factor password-authenticated key exchange protocol must remain secure even if all but one authentication secret is fully known to an adversary. Thus, the disclosed technology has the following characteristics: "strong two-factor server-to-client authentication," "strong two-factor client-to-server authentication," "protected authentication secrets," and "secure session key establishment."

The "strong two-factor server-to-client authentication" characteristic means that a server system is required to provide two authentication secrets in order to successfully convince a user or the user's client computer of its identity and to prove that the user has previously registered the authentication secrets with the server system; the "strong two-factor client-to-server authentication" characteristic means the user or user's client computer cannot successfully convince a server system of its/his/her identity without the user's client computer being able to access both of the authentication secrets (generally by prompting the user to input the authentication secrets); the "protected authentication secrets" characteristic means that no useful information about the authentication secrets is revealed during the authentication process between the client computer and the server system or in the communication between the two; and the "secure session key establishment" characteristic means that when the protocol completes, the client computer and server system can generate a secure shared session key suitable for bulk encryption if and only if the mutual authentication between the client computer and server system is successful.

In addition, the protocol should be independent of the scheme used to provide the short-term (symmetric) authentication secret. Any of the several options such as a PIN authenticated hardware device, a smart card, a USB token, one-time password generator or a set of challenges and corresponding responses preprinted in a codebook, etc. could be used as a scheme to provide the short-term (symmetric) authentication secret. To stop man-in-the-middle (MITM) attacks, the protocol assumes that the short-term (symmetric) authentication secret is session-specific—that is if the same user attempts multiple logins, the short-term (symmetric) authentication secrets (and hence the challenges in case of a challenge-response scheme) are different for each of those logins.

Figure 2:
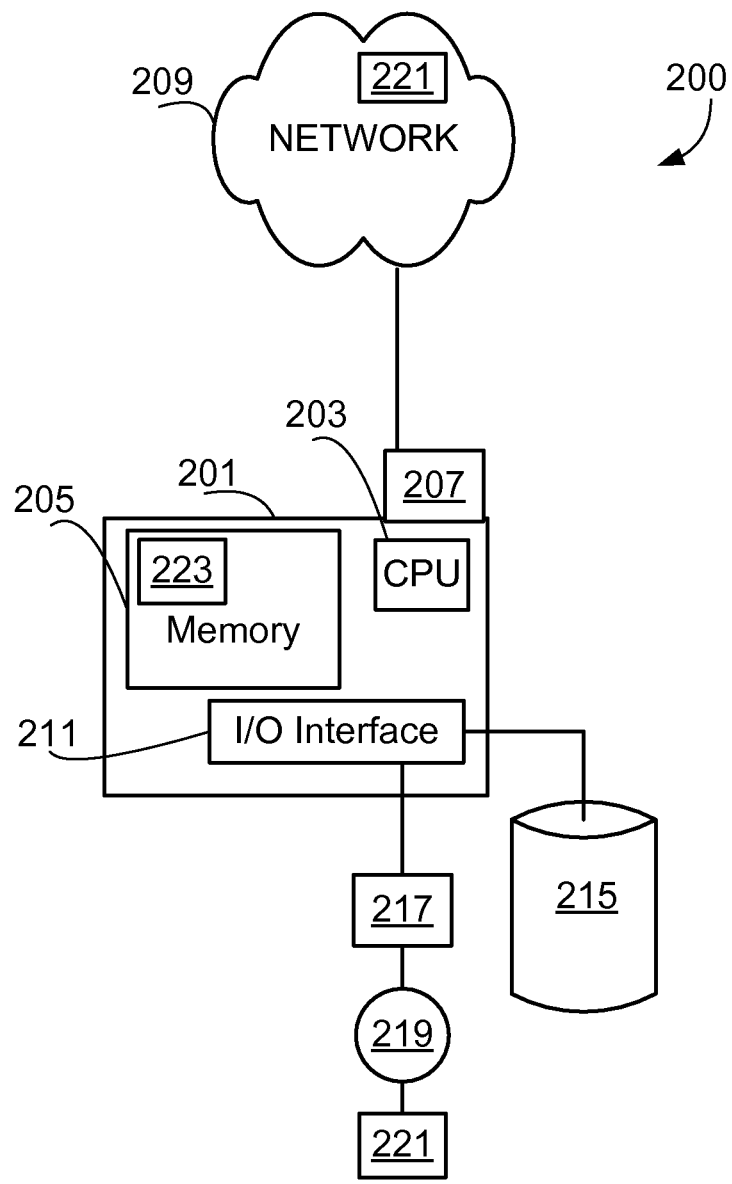
FIG. 2 illustrates a networked server system capable of using the disclosed technology.

FIG. 2 illustrates a networked server system 200 that can incorporate an embodiment supporting the server system. The networked server system 200 includes a server computer 201 that incorporates a CPU 203, a memory 205, and a network interface 207. The network interface 207 provides the server computer 201 with access to a network 209. The server computer 201 also includes an I/O interface 211 that can be connected to a storage system 215, and a removable data device 217. The storage system 215 can include database(s) that contain account, long-term (asymmetric) authentication secrets or transformations of long-term (asymmetric) authentication secrets. In addition, short-term (symmetric) authentication secrets can be stored in the storage system 215 as well as provided by a program (not shown), a device (not shown), or combination thereof. The removable data device 217 can read a computer-usable data carrier 219 (such as a fixed or replaceable ROM within the removable data device 217 itself (not shown)), as well as a computer-usable data carrier that can be inserted into the removable data device 217 itself (such as a memory stick, CD, floppy, DVD or any other tangible media) that typically contains a program product 221. The storage system 215 (along with the removable data device 217), the computer-usable data carrier 219, and (in some cases the network 209) comprise a file storage mechanism. The program product 221 on the computer-usable data carrier 219 is generally read into the memory 205 as a program 223 which instructs the CPU 203 to perform specified operations. In addition, the program product 221 can be provided from devices accessed using the network 209. One skilled in the art will understand that the network propagates information (such as data that defines a computer program). Signals can be propagated using electromagnetic signals, visible or invisible light pulses, signals on a data bus, or signals transmitted over any wire, wireless, or optical fiber technology that allows information to be propagated from one point to another. Programs and data are commonly read from both tangible physical media (such as those listed above) and from the network 209. Thus, the network 209, like a tangible physical media, can be a computer-usable data carrier. One skilled in the art will understand that not all of the displayed features of the server computer 201 need to be present for all embodiments that implement the techniques disclosed herein. Further, one skilled in the art will understand that computers that can use the disclosed technology are ubiquitous within modern devices ranging from cell phones to vehicles to kitchen appliances, etc.

The disclosed technology teaches multi-factor password-authenticated key exchange protocols that have the "strong two-factor server-to-client authentication," "strong two-factor client-to-server authentication," "protected authentication secrets," and "secure session key establishment" characteristics. The inventors have disclosed three embodiments of a Multi-Factor Password-Authenticated Key exchange protocol. The first of these embodiments has formal mathematical arguments describing its security under certain widely accepted computational assumptions. These formal arguments are included in U.S. Provisional Application No. 61/053,957 that is incorporated by reference. The second and third embodiments have not been formally analyzed, but serve as examples of other multi-factor password-authenticated key exchange protocol embodiments.

MFPAK is the first password-authenticated key exchange protocol to be based on multiple authentication secrets. The first factor authentication secret can represent a long-term user-memorized password (an authentication factor known to the user), and is an asymmetric secret in that the value stored on the server system is a transformation of the first factor authentication secret (thus, if the server system's database is compromised, the actual users' passwords are not exposed). The second factor authentication secret generally represents a dynamic one-time response value (an authentication factor that the user has). The second authentication secret can be a symmetric secret in that the client and the server system access (effectively) the same value. Some implementations of MFPAK allow for the second authentication secret to change over time (such as a value provided by a security token, one-time password list, etc.). However, the second authentication secret, even if changing, is accessible to both the user's client computer and the server system. It is accessible to the client computer because a user obtains the second authentication secret from a security token (password list, etc) and provides that value to the client computer. Both authentication secrets are tightly integrated into the authentication and key exchange processes. MFPAK uses aspects from both PAK and PAK-Z+. PAK is a symmetric protocol, whereas PAK-Z+ is an asymmetric protocol; both have a similar structure but use authentication secrets of different natures (for example, a long-term password should be asymmetric so that if the server system's account information is compromised, the passwords will be cryptographically difficult to discover, but a one-time password does not need to be so protected and hence can be symmetric).

MFPAK is efficient. In cryptographic protocols, the expensive computational processes are group exponentiations, group inversions, and signature generation and verification operations; inexpensive computational processes include group multiplication, addition, and hash function computation. MFPAK achieves two-factor security with almost the same efficiency as PAK-Z+. In particular, MFPAK uses the same number of expensive operations on the server side as PAK-Z+ (2 exponentiations, 1 signature verification), and only one more expensive operation on client side than PAK-Z+ (2 exponentiations, 1 signature generation, and 2 inversions (compared to the same but with only 1 inversion)). In many situations the limiting condition is the number of connections a server system can handle, and so MFPAK can increase security without substantial additional computational burden on the server.

The multi-factor password-authenticated key exchange protocols disclosed herein include a user registration stage that is completed once per user at each intended server system, and a login stage that is completed each time the user attempts to login to the server system from a client computer.

The MFPAK protocol is shown in FIG. 7 through FIG. 11. The protocol states are identified by the line number in these figures and are indicated as [-x-] where x is the line number. Some of the protocol lines represent group membership definitions as will be known to one skilled in the art. For example, lines [-1,2-] in FIG. 7 define the group membership for $pw_{C,S}$ and $re_{C,S}$. These definitions do not directly correspond to the acquisition of the long-term and short-term passwords from the user. One skilled in the art will be able to distinguish between and relate the protocol- and process-related aspects of the technology. Such a one will also understand that the generation of the inverted hashes γ' and τ' are an optimization, and that other implementations that generate the γ' and τ' during the login stage of the protocol instead of the registration stage are equivalent. In addition, such a one will understand that $H_x$ represents a secure hash function (for example SHA-1), and different values of x may denote different hash functions or may denote the same hash function, where the value of what is being hashed is concatenated with the value x, thereby differentiating, for example, the operation $H_1(y)$ from $H_2(y)$.

The term "long-term password hash" means a $hash_x$ of the account identifier, server identifier, and the first authentication secret (for example, a long-term password). The term "short-term password hash" means a $hash_x$ of the account identifier, server identifier, and the second authentication secret (for example, a short-term password).

The set of registration data can include γ' (an inverted long-term password hash), τ' (an inverted short-term password hash), V' (the private signature key shielded by a long-term password hash), and V'" (a hash of the private signature key) as well as the non-inverted representations. Note that one skilled in the art, without undue experimentation, would be able to implement a version of the MFPAK protocol where γ, τ, V, etc. are sent by the client to the server system instead of their inversions.

Figure 3:
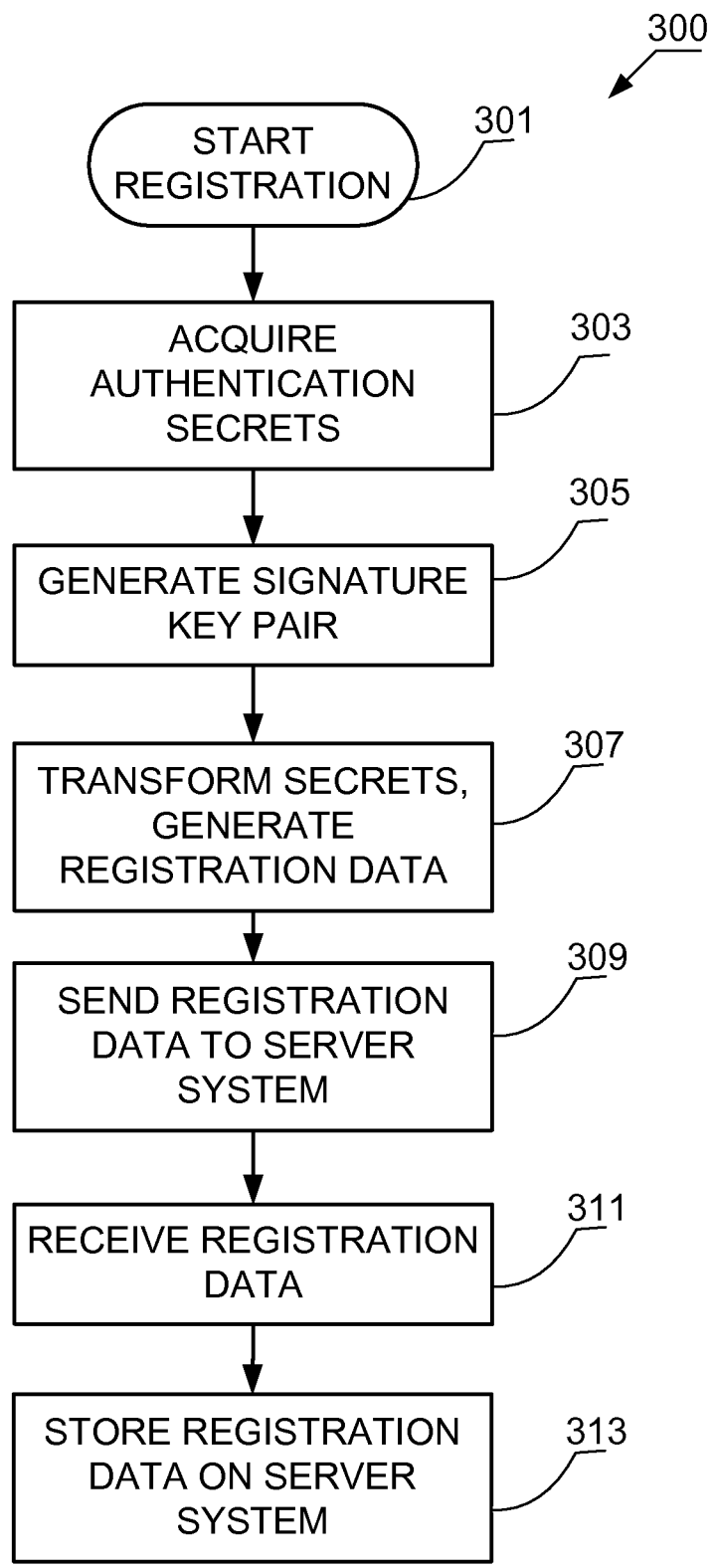
FIG. 3 illustrates the MFPAK registration process.

FIG. 3 illustrates a MFPAK registration process 300 that initiates when a user starts to register for an account with the server system. The line references [-x-] are to FIG. 7. This process should be completed over a private, authentic channel, such as by transporting the user's computer to the site of the service; by the user physically visiting a location of the business and interacting with its computers; or by using multi-channel authentication, such as a combination of communication via a computer network as well as communication via a separate channel, such as the postal service or telephone service. The MFPAK registration process 300, once started, initiates at a 'start' terminal 301 and continues to an 'acquire authentication secrets' procedure 303 that registers the user's account identifier, and acquires his/her first and second authentication secrets (for example, a long- and short-term password or other secrets from multiple authentication factors) [-1,2-]. A 'generate public-private signature key pair' procedure 305 generates a public-private signature key pair [-3-] (where V is the private signature key and W is the public signature key), and a 'construct set of registration data' procedure 307 constructs a set of registration data [-4,5,6,7-] that are transformations of at least some of the account identifier (C), the server identifier (S), the long-term authentication secret ($pw_{C,S}$), the short-term authentication secret ($re_{C,S}$) and the private signature key (at a minimum, the long-term authentication secret is transformed). These transformations construct an inversion of the long-term password hash [-4-]; construct the client's private signature key that is shielded by the long-term password hash [-5-]; construct a hash of the client's private signature key V [-6-]; and construct an inversion of the short-term password hash [-7-].

The account identifier, the public signature key, and the set of registration data [-8-] are sent to the server system by a 'send registration data to server system' procedure 309 and are received by the server system at a 'receive registration data' procedure 311. Once the set of registration data is received by the server system, it is stored by a 'store registration data' procedure 313 [-9,10-] for later retrieval when searched for by the account identifier. The set of registration data will be used by the server system to construct authentication evidence that will be sent to, and processed by, the user's computer to authenticate that the server system for subsequent communication is the same server system that participated in the registration ("server system" here representing one or a collection of server computers that provide the registered-for services). The set of registration data does not expose the authentication secrets acquired by the client computer to the network or the server system.

Some embodiments store the set of registration data in separate databases, while others spread portions of the set of registration data across multiple databases. Once the registration is complete, the MFPAK registration process 300 is complete, and the user is able to log into the server system using the account identifier and the process subsequently described with regards to FIG. 4-FIG. 6. One skilled in the art will understand that error and confirmation logic are implied but not discussed herein.

One skilled in the art will understand that, where appropriate, the "short-term" authentication secret can be a constant and not a changing value. This allows the flexibility for a multi-factor password-authenticated key exchange protocol (such as MFPAK) to be deployed as a one-factor protocol in certain application environments where high two-factor authentication security is not needed. This removes the need for the user to input two authentication secrets. Such a one would be able to implement such a variation of the multi-factor password-authenticated key exchange protocols (such as the MFPAK protocol) after reading the disclosure herein and without undue experimentation.

Figure 4:
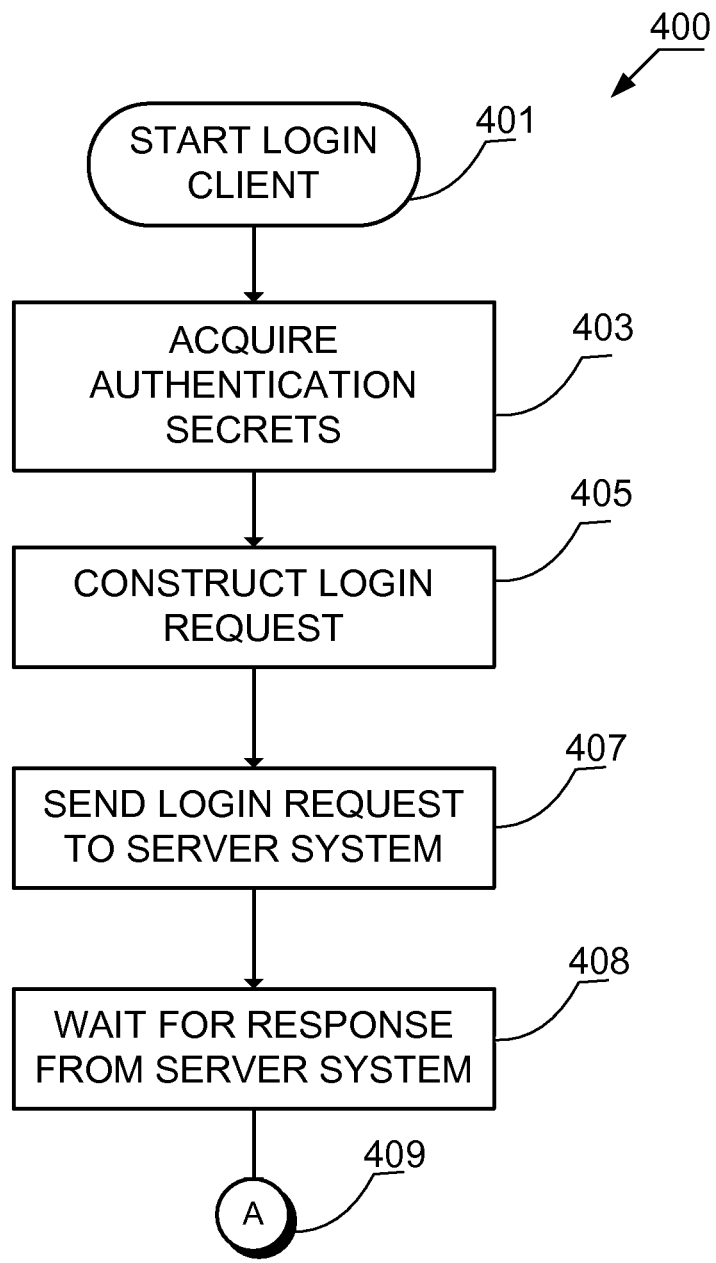
FIG. 4 illustrates a first portion of a client-side secure password authentication process.

FIG. 4 illustrates a secure client-side authentication process (part 1) 400 that is invoked after registration when the user desires to login to the server system. The line references [-x-] are to FIG. 8 through FIG. 11.

The secure client-side authentication process (part 1) 400 initiates at a 'start' terminal 401 and continues to an 'acquire authentication secrets' procedure 403 that prompts the user for, and acquires the account identifier, the long-term (asymmetric) authentication secret, and the short-term (symmetric) authentication secret. A 'construct login request message' procedure 405 selects an ephemeral private key x [-1-] and generates a Diffie-Hellman public key [-2-] as the client's ephemeral public DH key (X), applies transformations to the authentication secrets (by computing a long-term password hash [-3-], a short-term password hash [-4-], and the client's ephemeral public DH key (X) shielded by the long- and short-term password hashes [-5-]).

Figure 6:
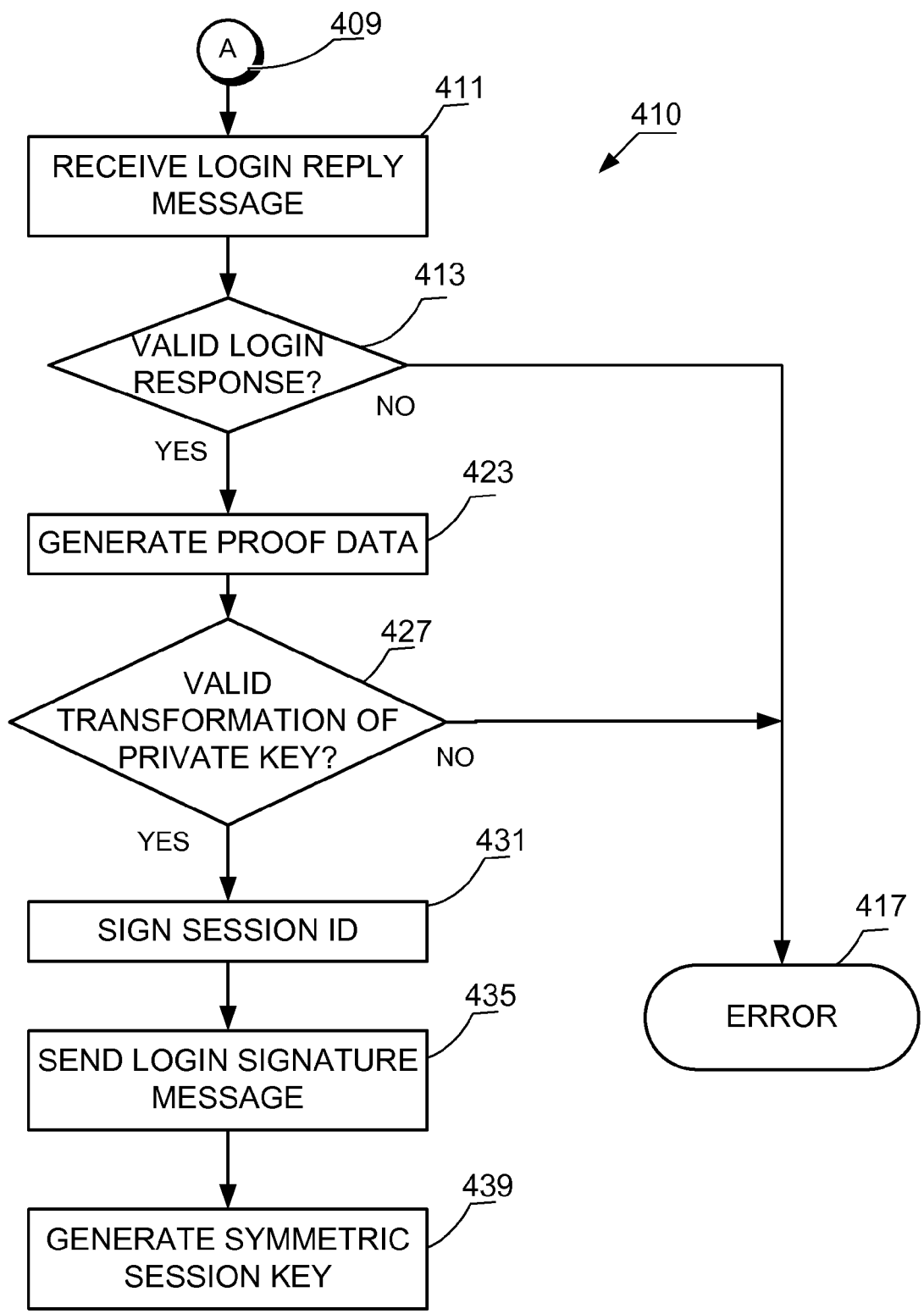
FIG. 6 illustrates a second portion of a client-side secure password authentication process and is a continuation of FIG. 4.
Figure 8:
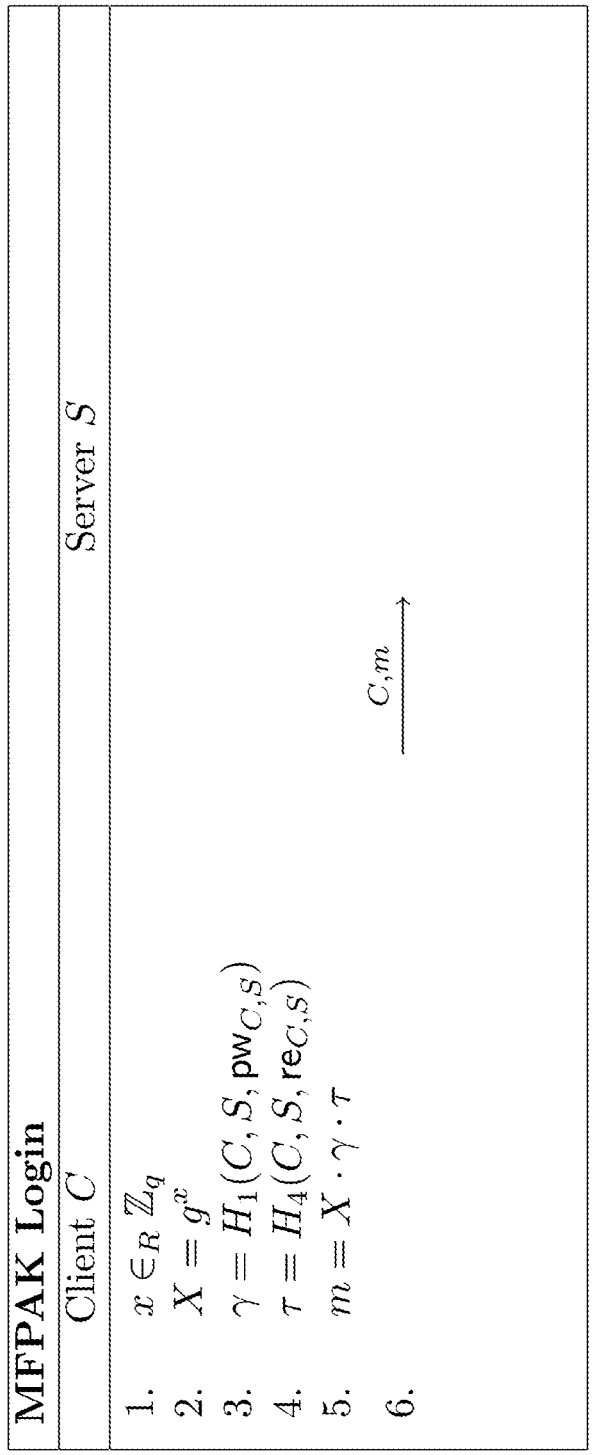
FIG. 8 presents the MFPAK login protocol client phase 1.

A 'send login request message to server system' procedure 407 constructs a login request message (that contains the account identifier, the client's shielded ephemeral public key, and the client's ephemeral public DH key (X)) and sends the login request message to the server system [-6-]. The secure client-side authentication process (part 1) 400 then waits for a response from the server system at a 'wait for server system response' procedure 408. The secure client-side authentication process (part 1) 400 continues as shown by FIG. 6 after it receives a response from the server system.

One skilled in the art will understand if the 'wait for server system response' procedure 408 does not receive a response within some time frame, the secure client-side authentication process (part 1) 400 will abort. Such a one will also understand that the login request message can be sent as a single message or as a sequence of messages if the account identifier and the client's shielded ephemeral public key can be assembled by the server system for equivalent processing as is subsequently described (and that such a sequence of messages can be in a query-response format, a series of UDP packets, via a TCP connection, etc.).

Figure 5:
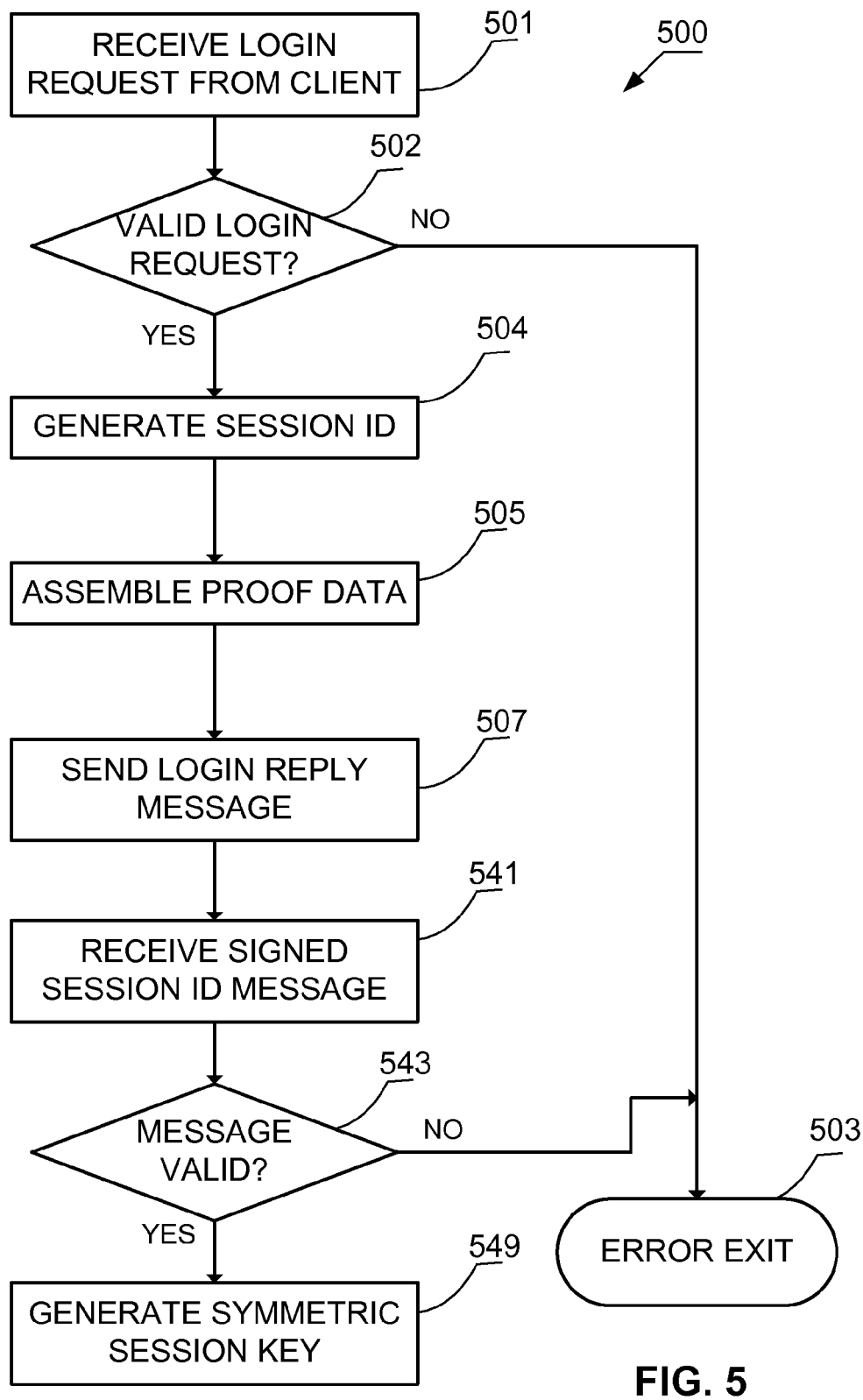
FIG. 5 illustrates a server system-side login process.

FIG. 5 illustrates a first portion of a server system-side login process 500 executing on the server system. The server system-side login process 500 can be a service application, daemon, etc. that is configured to receive login request messages sent by the 'send login request message to server system' procedure 407. One skilled in the art will understand how to configure such a service on the server system.

A 'receive login request message' procedure 501 at the server system receives the login request message sent by the 'send login request message to server system' procedure 407. A 'validate request message' decision procedure 502 verifies that the login request message is well constructed [-7-]. If the login request message is not well constructed, the server system-side login process 500 completes through a 'server system login abort' terminal 503 (thus, the 'wait for server system response' procedure 408 will time out), and the client and server system authentication fails.

If the login request message is well constructed, the server system-side login process 500 continues to a 'generate session identifier' procedure 504 that selects an ephemeral private key y [-8-], generates a Diffie-Hellman public key as the server's ephemeral public DH key (Y) [-9-], and uses the account identifier to retrieve the set of registration data that was stored by the 'store registration data' procedure 313 [-10,11-]. A 'generate session identifier' procedure 504 also regenerates the client's ephemeral public DH key (X) from the client's shielded ephemeral public key using γ' and τ' [-12-], generates a shared D-H(XY) secret (□) using the client's ephemeral public DH key (X) and the server system's ephemeral private key y [-13-], and generates a session identifier (sid) from the account identifier, the server identifier, server's ephemeral public DH key (Y), and the client's shielded ephemeral public key [-14-].

An 'assemble proof data' procedure 505 generates a hash (k) of the session identifier, the shared D-H(XY) secret, γ' and τ' [-15-] (k and V''' contribute to the first authentication evidence) that will be used by the client computer to verify that the server system knows the set of registration data that the client computer had sent during the 'construct set of registration data' procedure 307, thus allowing the client to authenticate the server system (MFPAK uses both k and V''' as the first authentication evidence; other MFPAK embodiments or other multi-factor password-authenticated key exchange protocols can use equivalents). The 'assemble proof data' procedure 505 transforms the client's private signature key [-16, 17-]. A 'send login reply message' procedure 507 constructs a login reply message from V''', k, a, and the server's ephemeral public DH key (Y), and sends the login reply message to the client computer being used by the user [-18-].

As is subsequently described, the first authentication evidence (k) is used by the client to verify that the server system has access to the set of registration data (transformed and/or shielded authentication secrets) for the account identifier and does so without exposing the authentication secrets to the network or to the client.

FIG. 6 illustrates a secure client-side authentication process (part 2) 410 that continues from FIG. 4 via a 'continuation-A' terminal 409. Once the client computer receives the login reply message at a 'receive login reply message' procedure 411, a 'validate login reply message' decision procedure 413 generates the shared D-H(XY) secret (□) from server's ephemeral public DH key (Y) and client's ephemeral private DH key (x) [-19-], generates the inverse of the transformations of the authentication secrets generated by the 'construct login request message' procedure 405 [-20,21-], and generates the session identifier using the server's ephemeral public DH key (Y) sent by the server system, the account identifier, server system identification, and the client's ephemeral public DH key (X) shielded by the long- and short-term password hashes (m) [-22-].

A 'validate login reply message' decision procedure 413 verifies that the transformation of the session identifier, the shared D-H(XY) secret, and the inverse of the transformations of the authentication secrets matches the first authentication evidence in the login reply message sent by the 'send login reply message' procedure 507 [-23-]. If the 'validate login reply message' decision procedure 413 determines that the corresponding values do not match (thus, the server system does not have access to the set of registration data sent by the 'send registration data to server system' procedure 309), the secure client-side authentication process (part 1) 400 aborts and completes through a 'client abort login' terminal 417 as the client is unable to authenticate the server system.

However, if the 'validate login reply message' decision procedure 413 determines that the server system does have access to the set of registration data (that is, the k received from the server system is equal to the corresponding computation generated using values known to the client), the secure client-side authentication process (part 1) 400 continues to a 'generate proof data' procedure 423 that computes second authentication evidence that will be used by the server system to authenticate the client computer (or its user). The client computes a 'and k' as shown by [-24,25-], and extracts the shielded private signature key V' of the client from the (a) received from the server system by the 'receive login reply message' procedure 411 [-26-]. Once V' is extracted, V can be unshielded [-27-] and the V''' sent from the server system can be verified against a hash of V by a 'valid private key' decision procedure 427. If the values do not verify, the client has been unable to authenticate the server system and the secure client-side authentication process (part 2) 410 error exits via the 'client abort login' terminal 417.

However, if the server system is authenticated, the secure client-side authentication process (part 2) 410 continues to a 'sign session id' procedure 431 that applies a cryptographic signature to the session identifier [-29-] and a 'send signed session ID message' procedure 435 sends the signed session identifier and k' to the server system [-30-] as the second authentication evidence.

Once the client has authenticated the server system (thus foiling man-in-the-middle attacks and the like), the client can safely establish a secure communication channel with the server system. To do so, a 'client symmetric session key generation' procedure 439 generates a symmetric session key by transforming the session identifier, the shared D-H(XY) secret, the long-term password hash, and short-term password hash [-33-], and establishes a secure channel using the symmetric session key as is known to one skilled in the art. In addition, any other operation using the symmetric session key known to one skilled in the art are available.

As is subsequently described, the second authentication evidence sent by the 'send signed session ID message' procedure 435 is used by the server system computer to verify that the client computer has access to the second plurality of authentication secrets (the first plurality of authentication secrets are related to the second plurality of authentication secrets in that at least one of the authentication secrets from the first or second plurality are a transformation of at least one of the authentication secrets from the other plurality) and does so without exposing the second plurality of authentication secrets to the network or to the server computer. If the verification of the second authentication evidence is successful, the client has been authenticated to the server system.

A 'receive signed session ID message' procedure 541 (FIG. 5) on the server system receives the signed session ID message and a 'valid signed session ID message' decision procedure 543 then verifies the second authentication evidence (k') sent by the 'send signed session ID message' procedure 435 [-31-] and also verifies the cryptographic signature on the signed session ID message [-32-]. If either of these tests fails the server system-side login process 500 was unable to authenticate the client and thus aborts through the 'server system login abort' terminal 503. Otherwise, the client computer has been authenticated to the server system.

Once the client computer has been authenticated (thus foiling man-in-the-middle attacks and the like), the server system can safely establish a secure communication channel with the client. To do so a 'server system symmetric session key generation' procedure 549 first generates a symmetric session key by transforming the session identifier, the shared D-H(XY) secret, and the transformed secrets [-33-] (this symmetric session key will be identical to that generated by the client by the 'client symmetric session key generation' procedure 439) and can establish a secure channel (or perform any other symmetric session key-enabled operation) using the symmetric session key as is known to one skilled in the art.

One skilled in the art, after reading the disclosure herein, will understand that even if the intended network connection 107 has been intercepted by the adversary system 105 and the first adversary network connection 109 has been established prior to running a multi-factor password-authenticated key exchange protocol, the adversary system 105 will not be exposed to the respective authentication secrets accessible by the client computer and the server system. Further, such a one will understand that the establishment of the first adversary network connection 109 (as well as a real establishment of the intended network connection 107 or any other secure channel) may result in a shared secret that can be incorporated as another factor within a multi-factor password-authenticated key exchange protocol. Such a one will also understand that running a multi-factor password-authenticated key exchange protocol over a secure channel (for example, one using TLS/SSL) provides a way for the server system to authenticate the client computer and/or user, as well as authenticating the server system to the client computer and/or user.

Other multi-factor password-authenticated key exchange protocol embodiments can be used to provide equivalent functionality with the previously described MFPAK protocol embodiment. One such embodiment (MFP-1) uses PAK-X and a two-mask challenge response protocol as building blocks. As previously discussed, PAK-X is a provably secure password-authenticated key exchange protocol known to one skilled in the art. The MFP-1 embodiment uses a variant of the symmetric encryption scheme called the two-mask challenge-response protocol based on the two-mask EKE protocol described by M. Abdalla, O. Chevassut, and D. Pointcheval, *One-time verifier-based encrypted key exchange*, V. Serge, editor, Proceedings of the 8th International Workshop on Theory and Practice in Public Key (PKC '05), volume 3386 of Lecture Notes in Computer Science, pages 47-64, Springer-Verlag, 2005.

TABLE 1

MFP-1 Registration Stage

| | Client | Server | |
|---|---|---|---|
| 1 | input username $I_C$ and Password pw | | |
| 2 | $U = H(I_C, I_S)$ | | |
| 3 | $x = H_0(I_C, I_S, pw)$ | | |
| 4 | $V = g^x$ | V, U→ | verify U is unique & store (U, V) |

Table 1 defines the registration stage of the MFP-1 implementation that includes user identity privacy. During registration, the server system stores (U, V) instead of the conventional ($I_C$, V), where $U=H_0(I_C, I_S)$—called the user identity token—is a hash of the concatenation of the server name $I_S$ and the client's username $I_C$ that is input by the user. The actual definition of $I_S$ will be implementation dependent but can be a domain name, IP address, server system name, etc. During the login stage of the MFP-1 implementation, the client computer sends the user identity token U instead of the plaintext username $I_C$ to the server system. Since the server system has indexed the password file by U, the server system can retrieve the record for the user and proceed with the remainder of the MFP-1 protocol. Hence, the user's account name is private such that if U were captured from the network, it would be more difficult to associate the user's identity from the U than from the capture of a cleartext account identifier.

The authentication secrets are transformed and sent to the server system. Since the verifier V in the MFP-1 implementation is bound to both the username $I_C$ and the server name $I_S$, the MFP-1 implementation makes a multi-user dictionary attack hard even if the server

TABLE 2

MFP-1 Login Stage

| | Client | | Server |
|---|---|---|---|
| 1 | Input username $I_C$ | U→ | lookup(U, $V_2$) |
| | U = H(Ic, Is) | ←challenge | $e_S$ = expected response |

TABLE 2-continued

MFP-1 Login Stage

| | Client | | Server |
|---|---|---|---|
| 2 | generate random a | A→ | check A != 0 |
| | $e_C$ = client response | ←B, $M_2$, C | generate random b |
| | $h_{11} = G(I_C, I_S, e_C)$ | | $h_{21} = G(I_S, I_C, e_S)$ |
| | $T = g^a \cdot h_{11}$ | | $B = g^b \cdot h_{21}$ |
| | input password pw | | $R_2 = H_1(I_C, I_S, V_2)$ |
| | $x = H_0(I_C, I_S, pw)$ | | $Ss_2 = A/R_2$ |
| | $V_1 = g^x$ | | $h_{22} = G(I_C, I_S, e_S)$ |
| | $R_1 = H_1(I_C, I_S, V_1)$ | | $S_2 = (Ss_2/h_{22})^b$ |
| | $A = T \cdot R_1$ | | generate random $c_2$ |
| | | | $C = g^{H(c2)}$ |
| | | | $M_2 = c_2$ XOR $H_2(S_2, V_2^{H(c2)}, e_S)$ |
| 3 | $h_{12} = G(I_S, I_C, e_C)$ | $M_1$→ | if $M_1$ != $H_3(S_2, c_2, e_S)$ abort; |
| | $S_1 = (B/h_{12})^a$ | | |
| | $c_1 = M_2$ XOR $H_2(S_1, C^x, e_C)$ | | |
| | if C != $g^{H(c1)}$ abort; | | |
| | $M_1 = H_3(S_1, c_1, e_C)$ | | |
| 4 | $K = H_4(U, I_S, A, B, S_1, c_1, V_1, e_C)$ | | $K = H_4(U, I_S, A, B, S_2, c_2, V_2, e_S)$ | password file is revealed.

Table 2 describes the login stage of the MFP-1 implementation. It mutually authenticates using two-factor key agreement. After the server system receives the user's identity token U, the server responds (assuming a challenge-response scheme, but other schemes such as sequence- or time-based schemes, etc. could be used) with a challenge (for example, a short-term password). The client computer proceeds as in PAK-X except that the Diffie-Hellman public key is now encrypted with the client's password mask $h_{11}$, generated using the user's second authentication secret (response $e_C$, for example, a one-time password) corresponding to the challenge for that session. Similarly the server-side Diffie-Hellman public key is encrypted with the server system's password mask $h_{21}$, generated using the expected second authentication secret response $e_S$.

The pre-session shared secret key is computed by both the server system and client computer. The client computer's pre-session shared secret key is $S_1=(B/h_{12})^a$; the server system's pre-session shared secret key $S_2$ equals $(Ss_2/h_{22})^b$, where $Ss_2=A/H_1(I_C,I_S,V_2)$, $h_{12}=G(I_S,I_C,e_C)$, and $h_{22}=G(I_C,I_S,e_S)$ where G is a full domain hash.

The server system and client computer arrive at the same shared secret—that is, $S_1$ equals $S_2$ which equals $g^{ab}$ if: 1) the server system's expected response $e_S$ equals the actual client response $e_C$; and 2) the verifier generated by client $V_1$ equals the verifier stored by server system $V_2$ (the V received and stored during step 4 of the registration stage of MFP-1).

The client computer verification of the server system in step 3, that is, C equals $g^{H(c1)}$, fails if the server system does not use the correct session key, verifier, and second authentication secret (that is, the client-side verify will succeed if $S_2$ equals $S_1$, verifier $V_2$ equals $V_1$ and second factor authentication secret $e_S$ equals $e_C$). This client-side verification uses the authentication evidence (B, $M_2$ and C) sent by the server system to verify that the server system has access to the related authentication secrets. The authentication evidence does not expose the authentication secrets to the network or to the client computer. Once the client has authenticated the server system, it sends its own authentication evidence ($M_1$) to the server system. Note that $M_1$ does not expose the authentication secrets to the network or to the server system.

Similarly the server system authentication of the client in step 3, uses the authentication evidence $M_1$ to verify that the client has access to the authentication secrets. The authentication secrets known to the server system are related to at least some of the authentication secrets in that some of the authentication secrets held by one system are transformations of the authentication secrets known to the other system. The server system verifies that the client has access to the related authentication secrets by determining whether $M_1$ equals $H_3(S_2,c_2,e_S)$, which will fail if the client did not use the correct session key and correct x (that is, $S_1$ equals $S_2$ and $c_1$ equals $c_2$ ($c_1$ will equal $c_2$ only if the client computer knew the correct x and the correct second authentication secret (response $e_C$))). Step 4 of the MFP-1 implementation establishes the shared session key.

Another a multi-factor password-authenticated key exchange protocol implementation (MFP-2) uses the SRP-6 protocol (see: Wu, T.: SRP-6: Improvements and Refinements to the Secure Remote Password Protocol, Submission to IEEE P1363.2 working group, October 2002) and a variant of the symmetric encryption scheme called the two-mask challenge-response protocol based on the two-mask EKE protocol described by M. Abdalla, O. Chevassut, and D. Pointcheval, *One-time verifier-based encrypted key exchange*, V. Serge, editor, Proceedings of the 8th International Workshop on Theory and Practice in Public Key (PKC '05), volume 3386 of Lecture Notes in Computer Science, pages 47-64, Springer-Verlag, 2005.

The registration stage of MFP-2 is the same as the registration stage of the MFP-1 implementation, and thus also includes the user identity privacy feature by adding a server name binding. The MFP-2 implementation does not use a salt value as is used in SRP (the SRP salt value makes an offline dictionary attack against multiple users more expensive because the work done against one user's verifier cannot be used against another user's verifier). Since the verifier V in the MFP-2 implementation is bound to both the username $I_C$ and the server name $I_S$, these two values act as an effective salt, in that hash computations performed when attempting an offline dictionary attack against one verifier cannot be reused since the next verifier incorporates a different username. Thus, the MFP-2 implementation makes a multi-user dictionary attack hard even if the server password file is revealed.

The MFP-2 implementation mutually authenticates using two-factor key agreement. Table 3 describes the login stage of the MFP-2 implementation. After the server system receives the user's identity token U, the server system responds with a challenge. The client computer proceeds as in SRP except that the Diffie-Hellman public key is now encrypted with the client's password mask $h_{11}$, generated using the user's authentication secret response $e_C$ corresponding to the challenge for that session. Similarly, the server system Diffie-Hellman public key is encrypted with the server system's password mask $h_{21}$, generated using the expected authentication secret response $e_S$ and then added to the verifier value $V_2$ stored by the server for the particular user during the registration stage.

The pre-session shared secret key is computed by the server system and client. The client computer's pre-session shared secret key is $S_1=(Ss_1)^{(a+x\cdot U_1)}$; the server system's pre-session shared secret key is $S_2=(Ss_2\cdot V_2^{U_2})^b$; where $$Ss_1 = \frac{B-g^x}{h_{12}}, Ss_2 = \frac{A}{h_{22}},$$

$h_{12}=G(I_S,I_C,e_C)$, $h_{22}=G(I_C,I_S,e_S)$, $U_1H_1(A,B,e_C)$ and $U_2=H_1(A,B,e_S)$.

The server system and client arrive at the same shared secret—that is, $S_1$ equals $S_2$ which equals $g^{(a+x\cdot U)b}$ (where U equals $U_1$ equals $U_2$) when: 1) the server system's expected response $e_S$ equals the actual client response $e_C$ and; 2) the verifier generated by the client $g^x$ equals the verifier stored by server system $V_2$ (the V received and stored during step 4 of the registration stage).

TABLE 3

MFP-2 Login Stage

| | Client | | Server |
|---|---|---|---|
| 1 | Input username $I_C$<br>U = H(Ic, Is) | U→<br>←challenge | lookup(U, $V_2$)<br>$e_S$ = expected response |
| 2 | generate random a<br>$e_C$ = client response<br>$h_{11} = G(I_C, I_S, e_C)$<br>$A = g^a \cdot h_{11}$ | A→<br>←B, $M_2$ | check A != 0<br>generate random b<br>$h_{21} = G(I_S, I_C, e_S)$<br>$B = g^b \cdot h_{21} + V_2$<br>$U_2 = H_1(A, B, e_S)$<br>$h_{22} = G(I_C, I_S, e_S)$<br>$Ss_2 = A/h_{22}$<br>$S_2 = (Ss_2 \cdot V_2^{U_2})^b$<br>$M_2 = H_2(S_2, V_2, U_2)$ |
| 3 | Input password pw<br>$x = H_0(I_C, I_S, pw)$<br>$V_1 = g^x$<br>$h_{12} = G(I_S, I_C, e_C)$<br>$U_1 = H_1(A, B, e_C)$<br>$Ss_1 = \dfrac{B-g^x}{h_{12}}$<br>$S_1 = (Ss_1)^{(a+x\cdot U_1)}$<br>Verify $M_2 == H_2(S_1, V_1, U_1)$<br>$M_1 = H_3(S_1, V_1, U_1)$ | $M_1$→ | Verify $M_1 ==$<br>$H_3(S_2, V_2, U_2)$ |
| 4 | $K = H_4(S_1)$ | | $K = H_4(S_2)$ |

The client-side verification of the server system in step 3, that is, $M_2$ equals $H_2(S_1,V_1,U_1)$, fails if the server system does not use the correct session key, verifier, and second authentication secret (that is, the client-side verification will succeed if $S_2$ equals $S_1$, verifier $V_2$ equals $V_1$ and second authentication secret $e_S$ equals $e_C$).

This client computer-side verification verifies the authentication evidence (B and $M_2$) sent by the server system as proof that the server system has access to the related authentication secrets. The authentication evidence does not expose the authentication secrets to the network or to the client. Once the client computer has authenticated the server system, it sends its own authentication evidence ($M_1$) to the server system. Note that $M_1$ does not expose the authentication secrets to the network or to the server system.

Similarly, the server system-side authentication of the client computer in step 3, uses the authentication evidence $M_1$ to verify that the client has access to the authentication secrets. The authentication secrets known to the server system are related to the authentication secrets known to the client computer as input by the user during the registration stage. The server system verifies that the client computer has access to the authentication secrets by determining whether $M_1$ equals $H_3(S_2,V_2,U_2)$.

As used herein, a procedure is a self-consistent sequence of steps that can be performed by logic implemented by a programmed computer, specialized electronics or other circuitry, or a combination thereof that lead to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any logic or combination of the foregoing. In particular, the methods and processes described herein can be implemented with logics such as (for example, but without limitation) a transmission logic, a receiver logic, an authentication logic, a registration receiver logic, and a storage logic, etc.

One skilled in the art will understand that the network carries information (such as informational data as well as data that defines a computer program). The information can also be propagated using a carrier-wave. Signals capable of propagating the information include electromagnetic signals, visible or invisible light pulses, signals on a data bus, or signals propagated over any wire, wireless, or optical fiber technology that allows information to be transmitted over a network. Programs and data are commonly read from both tangible physical media (such as a compact, floppy, or magnetic disk) and from a network. Thus, the network, like a tangible physical media, is a computer-usable data carrier.

One skilled in the art will understand that the technology disclosed herein is for a multi-factor password authentication process that eliminates existing phishing attack techniques and also reduces the value of stolen passwords.

From the foregoing, it will be appreciated that the two-factor server and client authenticated protocols have (without limitation) the following advantages:

1) The multi-factor password-authenticated key exchange protocols do not use client certificates or private keys and, thus, avoid usability and portability issues. In particular, the protocols are portable across computers, operating systems, web browsers, geographic locations, etc. Thus, the user does not need to: store any long-term data; use the same set of computers; know a server system's public key etc. The user specifies the account identifier, her/his first authentication secret (for example, a long-term password known to the user), and a second authentication secret from something the user has (for example, a device that provides a one-time code, a consumable codebook, etc.) and is securely logged in.

2) The multi-factor password-authenticated key exchange protocols allow one of the two factors to be disabled without compromising the security provided by the other factor. Thus, the protocols can seamlessly fallback to one-factor key authentication for Internet-based products and services whose risk assessments do not mandate a full-fledged two-factor authentication (for example, by using an agreed-upon second authentication factor that is a "one-time" password in the multi-factor password-authenticated key exchange protocol that does not change over multiple uses). However, when two-factor authentication is required, mutual authentication can use both the factors to authenticate each party.

3) The multi-factor password-authenticated key exchange protocols are efficient because, even though each of the multi-factor key exchange protocols use at least two single-factor protocols, the single-factor protocols are tightly coupled share exponentiation operations and reduce the number of round-trips over the network.

4) The multi-factor password-authenticated key exchange protocols are user-friendly because they allow the use of the same type of low entropy, human-memorable passwords that users are accustomed to using.

5) The multi-factor password-authenticated key exchange protocols carry the responsibility of unambiguously authenticating the two interacting parties without requiring burdensome user training, requiring the user to be unreasonably diligent, requiring that the user perform pattern and image recognition, or requiring the user to answer a multitude of security questions. Thus, human error is less likely to expose the authentication secrets.

6) The multi-factor password-authenticated key exchange protocols are safe because they do not expose any information about the authentication secrets to the network or to the other party being authenticated. Thus phishers or other malicious entities are unable to learn any information about the user's authentication secrets.

7) Multi-factor password-authenticated key exchange protocols make it difficult for anyone who does not have both authentication factors to impersonate the server system to the user. Even in the event of a compromise of the server system's authentication databases it is still difficult to impersonate the server system. In addition, it is difficult to impersonate the user to the server system for anyone without both the user's first and second authentication secrets.

8) The multi-factor password-authenticated key exchange protocols make it cryptographically hard for an active adversary to deduce the session key by interacting with the other party even if the authentication secret for one of the two factors is revealed.

9) The multi-factor password-authenticated key exchange protocols do not allow an adversary to deduce the user's authentication secrets or compromise future session keys even if a session key from a previous successful run of the protocol is compromised.

10) The multi-factor password-authenticated key exchange protocols make it cryptographically hard to guess the authentication secrets even if the adversary observes all the messages transmitted to establish several legitimate and successful sessions.

11) The multi-factor password-authenticated key exchange protocols make it hard to perform a multi-user dictionary attack even if the server system password file is revealed, because the work done searching for one user's password cannot help in the search for another user's password.

12) The multi-factor password-authenticated key exchange protocols would allow financial institutions and others to meet the most stringent two-factor recommendations set by the FFIEC mandate of OCC 2005-35 (Office of the Comptroller of the Currency (OCC) bulletin 2005-35 can be accessed on the Internet at the Federal Financial Institutions Examinations Council (FFIEC) website).

13) Using a multi-factor password-authenticated key exchange protocol makes it cryptographically hard to read data encrypted during a past session even if the user's account identifier, long term (asymmetric) authentication secret and the server system's authentication database is revealed along with the short term (symmetric) authentication secret for that past session.

14) The multi-factor password-authenticated key exchange protocols offer more assurance in authentication over existing protocols because stealing the long-term password alone (for example, by installing spyware) or losing the one-time password device, consumable codebook, etc. alone is insufficient to compromise the authentication procedure.

15) Some embodiments of a multi-factor password-authenticated key exchange protocols provide a user identity privacy feature that makes it hard for an adversary to guess the correct username even after interacting with the user.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed follows:

1. A computer controlled method for mutually authenticating a first computer and a second computer over a network, the computer controlled method comprising:

sending first authentication evidence by said first computer to said second computer, said first authentication evidence used to prove to said second computer that said first computer has access to a first plurality of authentication secrets without exposing said first plurality of authentication secrets, wherein said first authentication evidence comprises a shielded ephemeral public key (m) that is generated using an ephemeral public DH key (X), a hash $\tau$, and a hash $\gamma$, in accordance with $m=X\cdot\gamma\cdot\tau$, wherein $\tau$ is computed using a hash of an account identifier (C), an identifier for the first computer (S), and a short-term password ($re_{C,S}$), and wherein $\gamma$ is computed using a hash of C, S, and a long-term password ($pw_{C,S}$; and sending second authentication evidence by said second computer to said first computer, said second authentication evidence used to prove to said first computer that said second computer has access to a second plurality of authentication secrets without exposing said second plurality of authentication secrets, said first plurality of authentication secrets related to said second plurality of authentication secrets, whereby said first computer is authenticated to said second computer and said second computer is authenticated to said first computer.

2. The computer controlled method of claim 1, further comprising:

prompting, by said second computer, for one of said second plurality of authentication secrets; and acquiring, by said second computer, said one of said second plurality of authentication secrets.

3. The computer controlled method of claim 1, further comprising:
   authenticating said second computer by said first computer responsive to said second authentication evidence;
   constructing a symmetric session key by said first computer responsive to authenticating of said second computer;
   authenticating said first computer by said second computer responsive to said first authentication evidence; and
   constructing said symmetric session key by said second computer responsive to authenticating said first computer; wherein said symmetric session key is capable of being used to establish a secure channel between said first computer and said second computer.

4. The computer controlled method of claim 1, wherein sending said first authentication evidence and sending said second authentication evidence is performed over a secure channel.

5. The computer controlled method of claim 1, wherein said first plurality of authentication secrets are related to said second plurality of authentication secrets by at least one of said first or second plurality of authentication secrets being a non-identity transformation of at least one of said other plurality of authentication secrets.

6. The method of claim 1, wherein $\tau$ and $\gamma$ are computed in accordance with:

$$\tau = H_4(C, S, re_{C,S}); \text{ and}$$

$$\gamma = H_1(C, S, pw_{C,S}).$$

7. A computer controlled method comprising:
   sending first authentication evidence over a network by a first computer, said first authentication evidence capable of enabling a second computer to verify that said first computer has access to a first plurality of authentication secrets without exposing said first plurality of authentication secrets, wherein said first authentication evidence comprises a shielded ephemeral public key (m) that is generated using an ephemeral public DH key (X), a hash $\tau$, and a hash ($\gamma$), in accordance with $m = X \cdot \gamma \cdot \gamma$, wherein $\tau$ is computed using a hash of an account identifier (C), an identifier for the first computer (S), and a short-term password ($re_{C,S}$), and wherein $\gamma$ is computed using a hash of C, S, and a long-term password ($pw_{C,S}$); and
   receiving, by said first computer over said network, second authentication evidence, said second authentication evidence enabling said first computer to verify that said second computer has access to a second plurality of authentication secrets without exposing said second plurality of authentication secrets, said first plurality of authentication secrets related to said second plurality of authentication secrets, whereby said second computer is authenticated by said first computer and said first computer can be authenticated by said second computer.

8. The computer controlled method of claim 7, further comprising:
   receiving said first authentication evidence by said second computer over said network; and
   authenticating said first computer by said second computer responsive to said first authentication evidence and said second plurality of authentication secrets.

9. The computer controlled method of claim 7, further comprising:
   receiving said first plurality of authentication secrets; and
   storing said first plurality of authentication secrets.

10. The computer controlled method of claim 7, wherein said first plurality of authentication secrets are related to said second plurality of authentication secrets by at least one of said first or second plurality of authentication secrets being a non-identity transformation of at least one of said other plurality of authentication secrets.

11. The computer controlled method of claim 7, wherein sending said first authentication evidence and receiving said second authentication evidence is performed over a secure channel.

12. An apparatus having a central processing unit (CPU) and a memory coupled to said CPU comprising:
   a transmission logic configured to send first authentication evidence over a network by a first computer, said first authentication evidence capable of enabling a second computer to verify that said first computer has access to a first plurality of authentication secrets without exposing said first plurality of authentication secrets, wherein said first authentication evidence comprises a shielded ephemeral public key (m) that is generated using an ephemeral public DH key (X), a hash $\tau$, and a hash $\gamma$, in accordance with $m = X \cdot \gamma \cdot \tau$, wherein $\tau$ is computed using a hash of an account identifier (C), an identifier for the first computer (S), and a short-term password ($re_{C,S}$), and wherein $\gamma$ is computed using a hash of C, S, and a long-term password ($pw_{C,S}$);
   a receiver logic configured to receive over said network second authentication evidence as proof that said second computer has access to a second plurality of authentication secrets without exposing said second plurality of authentication secrets; and
   an authentication logic, responsive to said second authentication evidence received by the receiver logic, configured to verify that said first plurality of authentication secrets is related to said second plurality of authentication secrets, whereby said second computer is authenticated by said first computer and said first computer can be authenticated by said second computer.

13. The apparatus of claim 12, further comprising:
   a registration receiver logic configured to receive said first plurality of authentication secrets; and
   a storage logic configured to store said first plurality of authentication secrets.

14. The apparatus of claim 12, wherein said first plurality of authentication secrets are related to said second plurality of authentication secrets by at least one of said first or second plurality of authentication secrets being a non-identity transformation of at least one of said other plurality of authentication secrets.

15. The apparatus of claim 12, wherein the transmission logic sends said first authentication evidence over a secure channel and the receiver logic receives said second authentication evidence over a secure channel.

16. A computer program product comprising:
   a non-transitory computer-usable data carrier providing instructions that, when executed by a computer, cause said computer to perform a method comprising:
   sending first authentication evidence over a network by a first computer, said first authentication evidence capable of enabling a second computer to verify that said first computer has access to a first plurality of authentication secrets without exposing said first plurality of authentication secrets, wherein said first authentication evidence comprises a shielded ephemeral public key (m) that is generated using an ephemeral public DH key (X), a hash $\tau$, and a hash $\gamma$, in accordance with $m = X \cdot \gamma \cdot \tau$, wherein $\tau$ is computed using a hash of an account identifier (C), an identifier for the first computer (S), and a short-term password ($re_{C,S}$), and wherein γ is computed using a hash of C, S, and a long-term password ($pw_{C,S}$); and receiving, by said first computer over said network, second authentication evidence, said second authentication evidence enabling said first computer to verify that said second computer has access to a second plurality of authentication secrets without exposing said second plurality of authentication secrets, said first plurality of authentication secrets related to said second plurality of authentication secrets, whereby said second computer is authenticated by said first computer and said first computer can be authenticated by said second computer.

17. The computer program product of claim 16, further comprising:

receiving said first authentication evidence by said second computer over said network; and authenticating said first computer by said second computer responsive to said first authentication evidence and said second plurality of authentication secrets.

18. The computer program product of claim 16, further comprising:

receiving said first plurality of authentication secrets; and storing said first plurality of authentication secrets.

19. The computer program product of claim 16, wherein said first plurality of authentication secrets are related to said second plurality of authentication secrets by at least one of said first or second plurality of authentication secrets being a non-identity transformation of at least one of said other plurality of authentication secrets.

* * * * *

UNITED STATES PATENT AND TRADEMARK OFFICE
CERTIFICATE OF CORRECTION

PATENT NO. : 8,776,176 B2  Page 1 of 1
APPLICATION NO. : 12/143964
DATED : July 8, 2014
INVENTOR(S) : Stebila et al.

It is certified that error appears in the above-identified patent and that said Letters Patent is hereby corrected as shown below:

In the Specification

Column 15, line 18, delete "$U_1H_1$" and insert -- $U_1=H_1$ --, therefor.

In the Claims

Column 18, line 52, in Claim 1, delete "$(pw_{c,s};$" and insert -- $(pw_{c,s});$ --, therefor.

Column 19, line 42, in Claim 7, delete "$m=X\bullet\gamma\bullet\gamma,$" and insert -- $m=X\bullet\gamma\bullet\tau,$ --, therefor.

Signed and Sealed this
Twenty-fourth Day of February, 2015

Michelle K. Lee
*Deputy Director of the United States Patent and Trademark Office*